Oct. 13, 1959       H. M. KASCHER       2,908,041
METHOD FOR PRODUCING BEADLETS
Filed April 15, 1955                    2 Sheets-Sheet 2
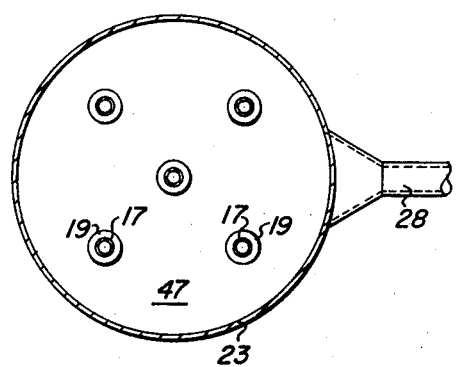
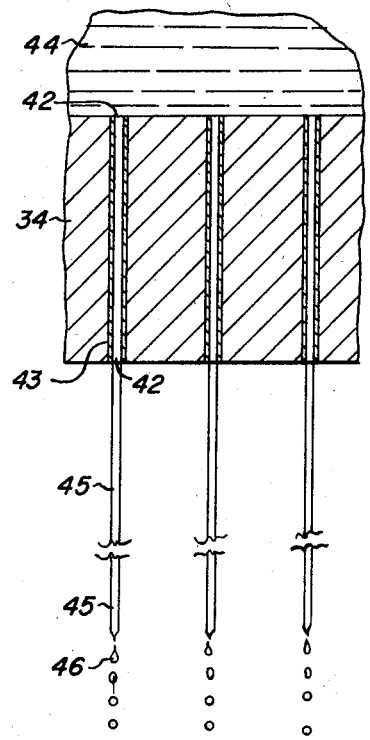
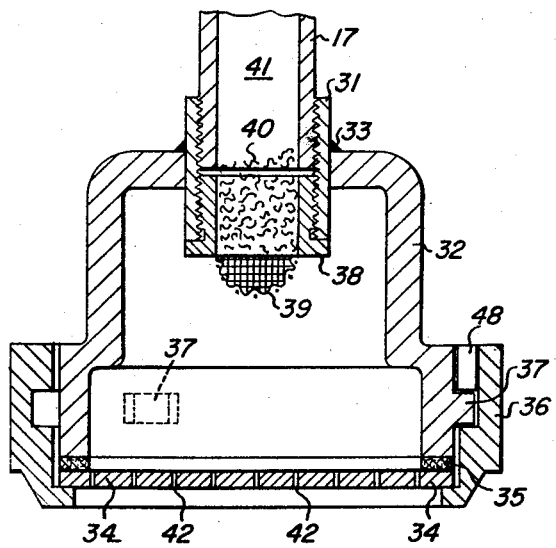
HENRY M. KASCHER
INVENTOR.
BY *Hoxx S. Woodruff*
ATTORNEY

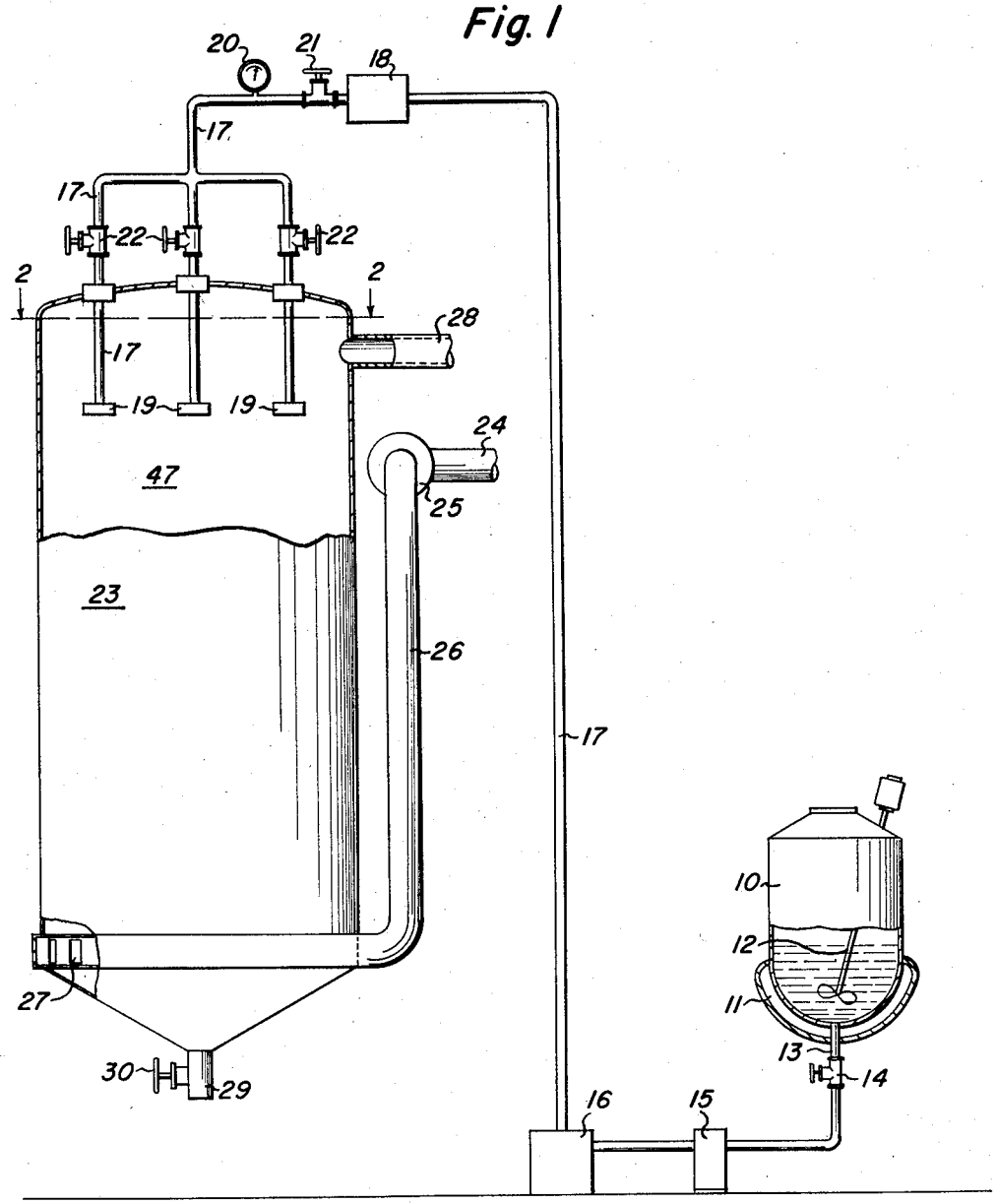

United States Patent Office 2,908,041
Patented Oct. 13, 1959

2,908,041

METHOD FOR PRODUCING BEADLETS

Henry M. Kascher, Rochester, N.Y., assignor to Eastman Kodak Company, Rochester, N.Y., a corporation of New Jersey Application April 15, 1955, Serial No. 501,628

2 Claims. (Cl. 18—47.2)

This invention is concerned with the preparation of beadlets, and particularly with methods and apparatus for the preparation of substantially uniformly sized beadlets.

Many commercial materials are prepared in beadlet form to best facilitate packaging, weighing, measuring, handling and dispersion when admixed with other materials. However, in preparing such beaded materials with such commonly used apparatus as spinning discs, sprays, atomizers and similar apparatus, non-uniformly sized beadlets as well as high proportions of fines or dusts generally are produced in the beading process. Screening and related means are used to prepare beadlets of uniform size or to separate the fines or dusts from the material beaded with such commonly used apparatus.

The utility and commercial desirability of many beaded products is greatly reduced if the product is comprised of mixtures of non-uniformly sized beadlets and fines. For example, beaded materials used for fortifying animal and poultry feeds and containing food supplements such as vitamins are usually more unstable in fine powder or dust form than in the usual beaded form. Further, non-uniformly sized beadlets containing food supplements are difficult to uniformly disperse in animal or poultry feeds, and, thus, equal doses of the oftentimes expensive food supplement are not available to the animal or fowl.

Accordingly, it is an object of this invention to provide an improved means for preparing substantially uniformly sized beadlets.

Another object of this invention is to provide an improved means for preparing beadlets without an objectionable amount of fines.

Another object of this invention is to provide a beading apparatus comprised of a novel type of extrusion head.

Another object of this invention is to provide an improved means for making substantially uniformly sized beadlets from a normally solid, fusible, organic material.

It is another object of this invention to prepare beadlets comprised essentially of a normally solid, fusible, fatty material without an objectionable amount of fines by a new and improved means.

It is a further object of this invention to extrude material comprised of a normally solid, fusible, organic carrier containing a minor proportionate amount of a food supplement into substantially uniformly sized beadlets by a novel and commercially feasible means.

These and other objects are attained by means of this invention as described more fully hereinafter with reference to a preferred embodiment thereof, as illustrated in the drawings.

In the drawings:

Fig. 1 is a view in elevation and partly in section illustrating somewhat schematically an embodiment of the apparatus of the present invention;

Fig. 2 is a sectional view taken along lines 2—2 of Fig. 1;

Fig. 3 is a view in sectional elevation of an extrusion head of the type employed in the beading apparatus illustrated in Fig. 1;

Fig. 4 is a fragmentary sectional view illustrating the extrusion of molten material through capillary extrusion bores in accordance with the present invention.

A preferred form of the beading apparatus is illustrated in Fig. 1. Feed tank 10, which contains the material to be beaded in a free-flowing, molten or fused state, is provided with steam jacket 11 and stirrer 12. From feed tank 10, the molten material flows through insulated and heated pipe section 13, through valve 14 and filter 15 to pump 16. By means of pump 16, the molten material is conveyed under pressure through insulated and heated pipe 17 and filter 18 to extrusion heads 19. Pipe 17 is provided with pressure gauge 20 and valves 21 and 22 to regulate the flow of molten material to extrusion heads 19. Extrusion heads 19 extend into a metal tubular structure which comprises beading column 23. Air is drawn into the system through air inlet duct 24 by blower 25, conveyed by air duct 26 to the lower portion of column 23, forced into column 23 through louvers 27 which are annularly disposed around the lower portion of column 23, and out the system through air outlet duct 28. The beaded product is removed from the beading column through outlet duct 29 by opening gate 30.

The sectional view of column 23 shown in Fig. 2 includes air outlet duct 28 and shows the dispersion of extrusion heads 19 and feed pipes 17.

Fig. 3 illustrates a typical extrusion head employed in a preferred embodiment of the herein described beading apparatus. Molten material to be beaded is fed into the extrusion head in the illustrated embodiment through feed pipe 17 which is fastened to the extrusion head by means of a threaded joint with threaded collar 31, collar 31 being fastened to metal housing 32 with fillet weld 33. Die plate 34 is held in place against gasket 35 by means of annular coupling cap 36 which is engaged by lugs 37, numeral 48 designating one of the slots in annular cap 36 for receiving lugs 37. The illustrated coupling is a bayonet-type coupling which can be readily disengaged by a partial turn of annular coupling cap 36. Removable insert 38, comprised of a threaded tubular body opened at one end and closed at the opposite end by fine mesh screen 39, is used in the preferred embodiment shown in the drawings to hold in place filtering media 40 across inlet opening 41. The molten material is extruded through capillary bores 42 located in die plate 34.

The cross section of die plate 34 illustrated in Fig. 4 includes capillary tubes 43 with capillary bores 42. Above die plate 34 is molten material 44 which is to be extruded through capillary bores 42 to form liquid streams 45 of considerable length, the streams in the drawing being drawn broken in the conventional manner. Extruded streams 45 divide into droplets 46 which solidify into discrete and substantially uniformly sized beadlets in the gaseous medium below die plate 34.

The material to be beaded is preferably comprised of normally solid, fusible, organic materials. Carrier materials such as mineral and vegetable waxes, solid fatty materials, and the like, and containing food supplements or fortifying materials such as vitamins, hormones, enzymes, amines, and others; and materials comprised primarily of such solid fatty materials as hydrogenated lard, beef tallow, mixtures of fatty acid mono- and di-esters of glycerine, high purity fatty acid monoesters of glycerine and the like, are typical examples of the materials that can be extruded into substantially uniformly sized beadlets in accordance with the present invention. As many of the beaded materials are labile or relatively unstable, minor proportionate amounts of stabilizers or antioxidants such as butylated hydroxy anisole, butylated hydroxy toluene, N,N'-diphenyl-p-phenylenediamine, nordihydroguaiaretic acid and similar antioxidants are oftentimes admixed with the molten material to be beaded.

In the embodiment illustrated by the drawings, the material to be beaded is reduced to a molten state in feed tank 10 by means of dish steam jacket 11, although other methods of heating can be employed. Likewise, the material to be beaded can be supplied to the feed tank already in the molten state. For example, high purity fatty acid monoesters of glycerine prepared by using high vacuum distillation can be conveniently conveyed in a molten state directly from molecular stills into the feed tank.

The molten material is maintained in a free-flowing molten state until it is extruded into beaded form. The pipes conveying the molten material from the feed tank to the extrusion heads are preferably heated and insulated to maintain the molten state of the material to be beaded.

The molten material is preferably conveyed from a feed tank under pressure through heated and insulated pipes by means of a pump. Gear-type pumps are particularly suited for this purpose, although other types of pumps such as centrifugal pumps and the like can be used. By means of such pumps and regulating valves in the feed line to the extrusion head, the molten material can be maintained under a substantially uniform pressure. Typical of such pressure regulating valves are valves 21 and 22 in the drawings. Pressures in the range of about 50 to 150 p.s.i. are more generally employed.

The molten material is extruded through the capillary bores in the present extrusion heads into liquid streams of substantially uniform cross section, such liquid streams extending a substantial distance from the extrusion head, oftentimes up to one or two feet, or in some cases even further, before breaking up into droplets and solidifying into discrete beadlets of substantially uniform size with the formation of substantially no fines. The size of the beadlets can be varied by such variants as the size of the capillary bore, the type of material to be beaded, the pressure at the die plate of the molten material, and the like. Beadlets of varying size can thus be prepared by the present process, with beadlets containing fortifying materials for admixing with animal and poultry feeds generally prepared in sizes ranging from about 20 to 60 mesh, and beadlets of such fatty materials as fatty acid monoesters of glycerine for use as emulsifiers in foods and cosmetics and the like generally prepared in sizes ranging from about 40 to 150 mesh. Mesh sizes referred to herein are of the U. S. Standard Sieve Series.

A stream of substantially inert gas, such as air, nitrogen, carbon dioxide, and the like, which is counter-current to the downwardly direction of the streams of molten material extruded from the extrusion heads is usually used to aid in the cooling and solidification of the beadlets. Similarly, a cooling stream of gas essentially concurrent to the flow of the extruded molten material can be employed. Such streams of gas are usually at about room temperature (20–30° C.), although any temperature sufficient to solidify the extruded molten material into discrete beadlets can be employed. Such streams of cooling gas can be provided by a blower such as illustrated by blower 25 in the drawing. While streams of gas are preferably employed in beading columns to aid in the cooling and solidification of the beadlets, columns without such cooling means can be less desirably employed in the present process.

The extrusion head referred to herein is to be distinguished from the ordinary spray heads, atomizers and other related devices commonly employed for producing beadlets or small particles of normally solid and fusible materials. The present extrusion head particularly distinguishes itself in that it can be employed to effect the preparation of substantially uniformly sized beadlets with a reduced number of fines.

Extrusion heads, as illustrated by Fig. 3, vary in size in accordance with the throughput desired in the beading system, and similarly, the number of extrusion heads employed in a beading system can also be varied with the throughput desired. If a plurality of extrusion heads are employed, as shown in the drawings, they are arranged laterally in spaced apart relation in the upper portion of the beading column so that downwardly extruded streams of molten material from the respective extrusion heads do not cross in the gaseous cooling chamber to interfere with the formation of discrete and substantially uniformly sized beadlets. To the same end, the individual capillary bores are suitably arranged in substantially parallel and laterally spaced apart relation in the die plate of the extrusion heads.

The present extrusion head consists essentially of a hollow outer member forming a fluid chamber, an inlet opening into this fluid chamber for receiving molten material under pressure, and a die plate forming a portion of the wall of the fluid chamber, the die plate usually being disposed essentially opposite the inlet opening.

Stainless steel is eminently suited for use in constructing such extrusion heads although other metals and materials such as aluminum, plastics, glass and the like can also be employed.

The die plate employed in the extrusion head is a plate of substantial thickness which is rigid and inflexible to the pressures employed in the system for extruding the molten materials. Extending through the die plate are a plurality of uniformly and cylindrically shaped, substantially parallel capillary bores. While any uniformly and cylindrically shaped bores of capillary size can be employed, capillary bores ranging in size from about .001 to .015 inch are particularly suitable in the present die plate for preparing beadlets ranging in size from about 20 to about 150 mesh.

Capillary bores of substantially the same diameter are usually employed in a single extrusion head. However, capillary bores of different and predetermined sizes can also be used in the same extrusion head to prepare a distribution of beadlets in a controlled size range. The embodiment shown in Fig. 4 of the drawings illustrates bores of capillary size made in die plates by a preferred method. As uniform and cylindrical bores of capillary size are difficult to make by ordinary drilling methods, the capillary bores in illustrated die plate 34 were made by press-fitting capillary tubes 43 into drilled bores of slightly larger diameter than the capillary tubes. Capillary tubes 43 were sections of a uniformly drawn stainless steel capillary tube of the type commonly used in making hypodermic needles and the like, and thus, by press-fitting similar sections of a capillary tube into die plate 34, a plurality of highly uniform and cylindrical bores of capillary size were made in the die plate. While the capillary bores in the extrusion head die plate are preferably made by press-fitting capillary tubes into drilled holes in the die plate, any other method suitable for making cylindrical and substantially uniform bores of capillary size can also be employed.

A removable annular coupling cap, of the type illustrated in Fig. 3 and designated by numeral 36 in the drawings, provides a means for holding the die plate rigidly in place, and for removing the die plate for cleaning or replacement. Likewise, filtering means disposed within the extrusion head can also be easily cleaned or replaced. Accordingly, such a removable coupling cap is a desirable, although not a necessary, part of the extrusion head.

Because the capillary bores in the die plate can be easily obstructed with unfused foreign particles such as are inherent to most of the commercially provided fused materials employed, strainers, filters and the like are desirably inserted in the feed lines which convey the fused material to the extrusion head. Foreign particles partly obstructing the extrusion bores tend to cause the formation of non-uniformly sized beadlets, particularly the formation of undesirable fines. The apparatus illustrated by Fig. 1 has a pot-type strainer located in the pipe section near the feed tank, and a wool fiber filter located in the feed pipe near the top of the beading column. Similarly, it is desirable, although not necessary, to insert a filter in the extrusion head across the inlet opening. Typical of such extrusion head filters is illustrated in the drawings by filtering media 40 which is held in place by screen 39. Such filters are preferably comprised of fibrous materials such as cotton wadding. Likewise, a fine mesh screen positioned across the inlet opening of the extrusion head can be suitably employed.

The invention is further illustrated by certain preferred embodiments thereof as set out in the following examples.

EXAMPLE 1

A composition comprised primarily of a mineral microcrystalline wax having a melting point of about 85° C. and a minor proportionate amount of an antioxidant stabilized vitamin A palmitate was extruded into beadlet form in accordance with the present invention. A stainless steel extrusion head similar to that represented by Fig. 3 in the drawings was used, including the use of a cotton wadding filter media disposed across the fluid inlet opening in the extrusion head. The die plate in the extrusion head was comprised of a two inch stainless steel disc approximately 0.17 inch in thickness and contained 37 capillary bores having an inside diameter of about .006 inch. The capillary bores were made by press-fitting capillary tubes into drilled bores of slightly larger diameter than the capillary tubes. The molten material was extruded into beadlet form at a substantially uniform pressure of about 80 lbs. per square inch, at a rate of about 1.60 lbs. per capillary bore per hour, and at a temperature of about 100° C. The molten composition was extruded into beadlet form in a 30 foot enclosed column. The solidification of the beadlets in the column was facilitated by a cooling counter-current stream of air at about room temperature being drawn into the system near the bottom of the column and removed from the system near the top of the column. The following table includes data obtained on screening the resulting beaded product.

Table

| Mesh Size of Screen | Percent |
|---|---|
| Held on No. 20 | 0.7 |
| Through No. 20 and held on No. 30 | 18.2 ⎫ |
| Through No. 30 and held on No. 40 | 52.5 ⎬ 97.5 |
| Through No. 40 and held on No. 50 | 26.8 ⎭ |
| Through No. 50 | 1.8 |

As shown in the above table, a high degree of uniformity in size was obtained, with 97.5% of the beadlets falling in the size range of 20 to 50 mesh.

EXAMPLE 2

About 14,800 lbs. of a high purity monoester of glycerine, commonly referred to as "monoglycerides," derived essentially from fully hydrogenated lard, were extruded into beadlet form with an extrusion head and a beading column similar to that described in Example 1. The die plate in the extrusion head was comprised of a three inch stainless steel die plate, about 0.17 inch in thickness, and containing 60 capillary bores having an inside diameter of about .006 inch. The capillary bores in the die plate were made by press-fitting capillary tubes into drilled bores of slightly larger diameter than the capillary tubes. The monoester was melted and extruded at a temperature of about 100° C. and at a pressure of about 100 lbs. per square inch. Substantially all of the resulting beadlets of monoester were in the size range of 20 to 50 mesh. Of the 14,800 lbs. of monoester beaded, only 11 lbs. of fines smaller than about 100 mesh resulted.

While the invention has been described in considerable detail with reference to certain preferred embodiments thereof, it will be understood that variations and modifications can be effected within the spirit and scope of the invention as disclosed hereinabove and as defined in the appended claims.

I claim:

1. The method for beading a normally solid, fusible, higher fatty acid monoester of glycerine which comprises extruding said monester in a fused state substantially free of unfused particled material under a substantially uniform pressure in the range of 50 to 150 pounds per square inch through a substantially uniformly and cylindrically shaped capillary bore having a diameter in the range of .001 to .015 inch, said extruded monoester being extruded in a capillary size liquid stream of a substantially uniform cross section a substantial distance into a gaseous cooling chamber, said liquid stream thereafter dividing into droplets and solidifying into discrete and substantially uniformly sized beadlets substantially in the size range of 20 to 150 mesh in said cooling chamber.

2. The process according to claim 1 wherein the monoester of glycerine has the fatty acid moieties of hydrogenated lard.

References Cited in the file of this patent

UNITED STATES PATENTS

| | | |
|---|---|---|
| 1,837,869 | Jewett et al. | Dec. 22, 1931 |
| 1,951,790 | Curran | Mar. 20, 1934 |
| 2,113,279 | Olin et al. | Apr. 5, 1938 |
| 2,629,898 | Orsini | Mar. 3, 1953 |
| 2,633,604 | Allen | Apr. 7, 1953 |
| 2,699,576 | Colbry | Jan. 18, 1955 |
| 2,709,834 | Johnson | Jan. 7, 1955 |